United States Patent
Dao et al.

(10) Patent No.: US 10,230,648 B2
(45) Date of Patent: Mar. 12, 2019

(54) METHOD AND SYSTEM FOR RATE ADAPTATION FOR DATA TRAFFIC

(71) Applicant: Huawei Technologies Co., Ltd., Shenzhen (CN)

(72) Inventors: Ngoc Dung Dao, Ottawa (CA); Hamidreza Farmanbar, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 14/983,061

(22) Filed: Dec. 29, 2015

(65) Prior Publication Data

US 2016/0218983 A1    Jul. 28, 2016

Related U.S. Application Data (60) Provisional application No. 62/107,826, filed on Jan. 26, 2015.

(51) Int. Cl.
*H04L 12/26* (2006.01)
*H04L 12/825* (2013.01)
*H04L 12/835* (2013.01)
*H04L 29/06* (2006.01)

(52) U.S. Cl.
CPC .............. *H04L 47/25* (2013.01); *H04L 47/30* (2013.01); *H04L 65/1026* (2013.01); *H04L 65/4092* (2013.01); *H04L 65/602* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 6,119,235 | A * | 9/2000 | Vaid | H04L 41/0896 709/235 |
| 2008/0198746 | A1* | 8/2008 | Kwan | H04L 47/10 370/231 |
| 2009/0296570 | A1 | 12/2009 | Luo et al. | |
| 2010/0138920 | A1* | 6/2010 | Kim | H04L 63/1416 726/22 |
| 2010/0165846 | A1* | 7/2010 | Yamaguchi | H04B 7/15592 370/236 |
| 2012/0079132 | A1* | 3/2012 | Liu | H04L 1/0002 709/233 |
| 2013/0124753 | A1* | 5/2013 | Ansari | H04L 47/263 709/235 |
| 2014/0079170 | A1 | 3/2014 | Le Houerou et al. | |
| 2015/0188831 | A1 | 7/2015 | Farmanbar et al. | |

FOREIGN PATENT DOCUMENTS

| | | |
|---|---|---|
| CN | 101350699 A | 1/2009 |
| CN | 102055782 A | 5/2011 |

OTHER PUBLICATIONS

3GPP TS 26.346. "Multimedia Broadcast-Multicast Service: MBMS Protocols and Codecs"; SA4, Release 13, Mar. 2016.

* cited by examiner

*Primary Examiner* — Zewdu A Beyen
(74) *Attorney, Agent, or Firm* — Slater Matsil, LLP (57) ABSTRACT

A method for rata adaption and a network device providing rate adaption are disclosed. In an embodiment the method includes determining a source rate adjustment in accordance with a buffer status of a radio node and transmitting towards a traffic source, a source rate adjustment request in accordance with the determined source rate adjustment.

21 Claims, 5 Drawing Sheets

METHOD AND SYSTEM FOR RATE ADAPTATION FOR DATA TRAFFIC

This application claims the benefit of U.S. Provisional Application No. 62/107,826, filed on Jan. 26, 2015, which application is hereby incorporated herein by reference.

TECHNICAL FIELD

The present invention relates to coding, and, in particular embodiments, to a method and system for rate adaptation for data traffic with and without forward error control coding, including fountain coding.

BACKGROUND

Fountain coding (FC) is widely used in content distribution networks, e.g., 3rd Generation Partnership Project (3GPP) multimedia broadcast multicast service (MBMS), internet protocol television (IPTV), and digital video broadcasting (DVB). One feature of FC is the capability to create a very large number of independent repair packets from original data packets to compensate for unknown packet loss/drop probability in complex networks.

SUMMARY

An embodiment method for rate adaptation includes determining a source rate adjustment in accordance with a buffer status of a radio node and transmitting towards a traffic source, a source rate adjustment request in accordance with the determined source rate adjustment.

An embodiment network device providing rate adaptation includes a processor and a non-transitory computer readable storage medium storing programming for execution by the processor, the programming including instructions for determining a source rate adjustment in accordance with a buffer status of a radio node and transmitting towards a traffic source, a source rate adjustment request in accordance with the determined source rate adjustment.

An embodiment traffic engineering (TE) controller providing rate adaption includes a processor and a non-transitory computer readable storage medium storing programming for execution by the processor, the programming including instructions for receiving a buffer status of a radio node, calculating a source rate adjustment in accordance with the buffer status, and transmitting towards a traffic source a source rate adjustment request in accordance with the determined source rate adjustment.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

When a User Equipment (UE) moves through a radio access network it connects to different Access Points (APs). The capacity of the wireless links used by the UE to connect to different APs may vary significantly and change quickly. Decisions taken by a traffic engineering (TE) controller to route the data traffic through the backhaul and the radio access network can be suboptimal.

Embodiments provide a method and system for adapting source data rates for different channels based on the traffic flow and the capacity of the wireless links. In various embodiments, messages are exchanged between radio nodes and the traffic engineering (TE) controller or traffic source (e.g., data gateway), where the fountain coded packets are created from original data packets.

Further embodiments provide a method for adjusting the source data rate of a traffic source by combining centralized TE and per-flow rate update. The rate update calculation may be performed at the traffic source, the TE controller, or the radio nodes. In some embodiments, when performed at the TE controller, rate update calculation can be either joint optimization or per-flow update (e.g., only per flow update). In some embodiments, messages are sent from radio nodes to the TE controller or traffic source for calculating a per-flow rate update. In other embodiments, the radio node calculates rate updates for flows and sends them back to the traffic source for rate adaptation.

Known systems include centralized traffic engineering with joint optimization for rate allocation for all flows. Various embodiments provided herein include a per-flow rate adaptation of source data rate of flows to reduce optimization complexity and communication delay.

Advantages may include almost no increase in computational complexity and quick rate adaptation which may significantly reduce packet redundancy in the backhaul network. In various embodiments with fountain coding, redundancy is reduced, and effective data rate delivery efficiency is increased when the channel conditions are better. In various embodiments without fountain coding, better rate selection avoids long packet delay (for a poor channel), and improves effective data rate (when the channel condition is better).

Figure 1:
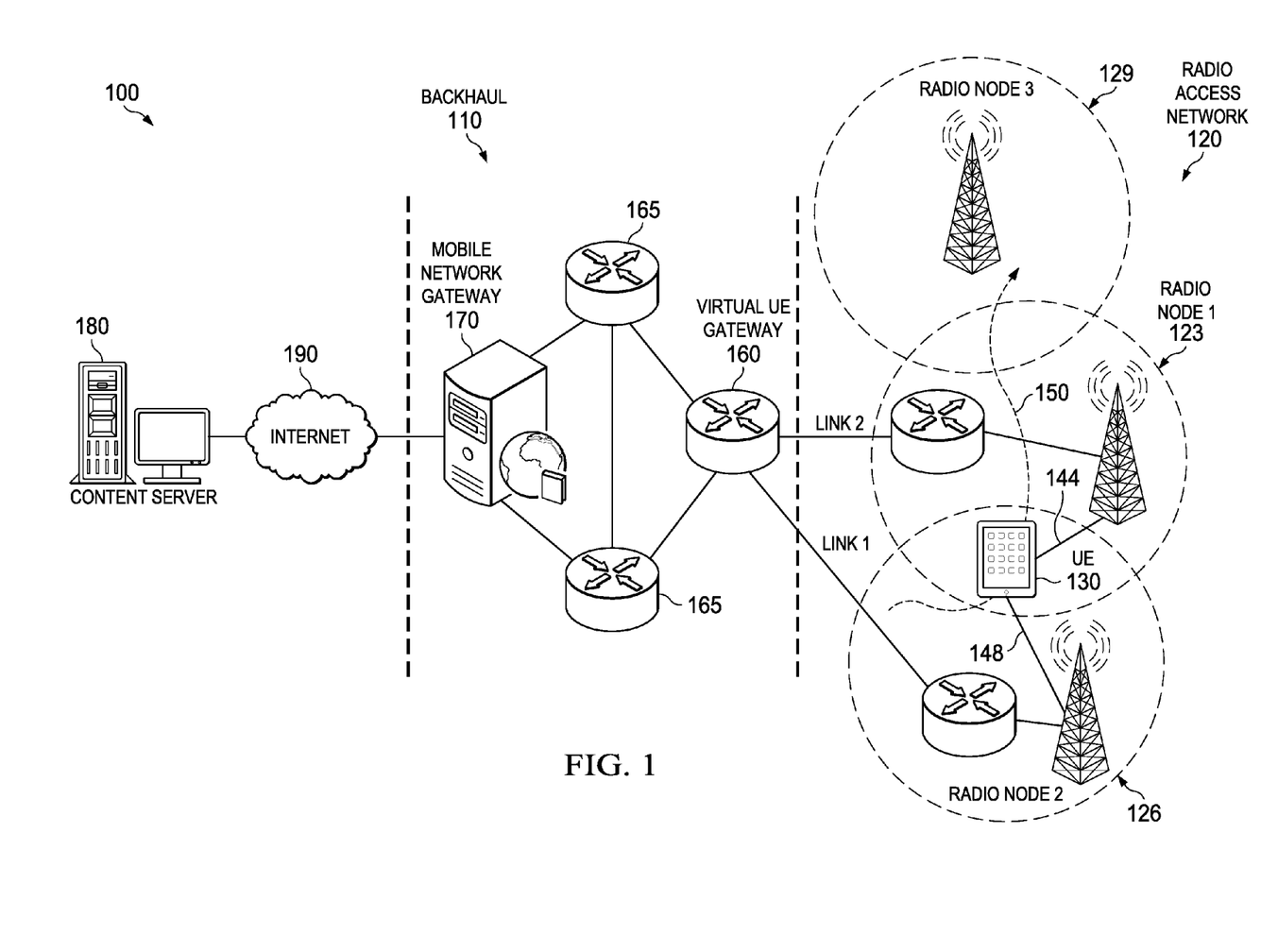
FIG. 1 illustrates a movement of a user equipment (UE) through a communications system.

FIG. 1 illustrates a movement 150 of a user equipment (UE) 130 through a communications system 100. FIG. 1 shows a mobile operator's backhaul network 110 and a radio access network (RAN) 120. The access network 120 includes radio nodes 123, 126, and 129 providing service to the UE 130. The radio nodes 123, 126 and 129 can be wirelessly coupled to the UE 130 by wireless links 144 and 148 when the UE is in an appropriate location. The radio nodes 123, 126 and 129 are connected to routers 165 and the mobile network gateway 170 in the backhaul network 110 via multiple links (LINK1, LINK2). The backhaul network 110 and the RAN 120 may comprise wired links with fixed capacity or wireless links with variable capacity. Backhaul network 110 further comprises gateways 160, 170 and other network devices. The virtual user gateway 160 (which may be specific to a particular UE) may function as a serving gateway to the UE and the mobile network gateway 170 may be the interface of the backhaul network 110 to the internet (e.g., function as the packet data network gateway (PDN)).

The backhaul network 110 connects radio nodes 123, 126, 129 and UE 130 to the virtual user gateway 160 through multiple paths. The gateway 160 may be a virtual gateway. Data sources 180 can be inside the backhaul network 110 or outside accessible via the internet 190. In some embodiments data sources 180 can be content servers (e.g., media servers). In other embodiments data gateways 160, 165 (e.g., routers) or 170 can be data sources because they distribute or redistribute data packets. A UE 130 moves through the coverage area of radio nodes 123 and 126 and receives content and data through wireless links 144 and 148 in the different radio nodes 123 and 126.

The UE 130 may request data files from a data source (e.g., content server 180, mobile data gateway 170, etc.). The data traffic from the data source 170, 180 to the UE 130 may be routed over multiple paths via various wireline links (e.g., mesh network), various radio nodes 123 and 126 and various wireless links 144 and 148 thereby providing multiple connections from the data source 170, 180 via the radio nodes 123 and 126 to the UE 130.

The traffic engineering (TE) controller deals with routing data flows from their sources to corresponding destinations. A flow is identified by a source-destination pair. In a multipath TE operation, several paths are used for each flow to satisfy demand. Compared to a single path TE operation, the multipath TE operation provides more flexibility for flow routing as there are multiple paths available for each flow.

The TE function may be implemented in a central or a local TE controller (or TE organizer) which determines a set of paths as well as rate allocation on each path for each flow based on knowledge of the network topology, link capacities and flow demands. In particular, the link capacities in a RAN 120 are not fixed and may vary constantly since it depends on the amount of available resources (e.g., frequency, time, etc.).

When the UE 130 moves through the RAN 120, the capacity of the wireless links may vary significantly and change quickly. The variation in the capacity of the links can be due to a number of different factors. As the UE moves out of the range of a first radio node, and into the coverage area of another node, the different wireless links to each radio node will change. In the coverage area of a particular access node, interference due to other transmitters or physical obstacles can also result in different link capacities. Decisions taken by a conventional TE controller (or organizer) to route the data traffic through the backhaul network 110 and the RAN 120 can be suboptimal. To catch up with the link or channel variations, the conventional TE controller may need to run more frequently (e.g., more frequently adjust the paths used to send the data packets through the network). However, more frequent TE operations may congest the network and require more feedback information from the UE 130 and flow update commands to the network routers.

The data sources (e.g., content server 180, mobile network gateway 170, routers 165 and virtual UE gateway 160) may perform fountain coding thereby encoding data. A fountain code is a code which generates a potentially limitless sequence of encoding symbols (e.g., encoded packets) from a given set of source symbols (e.g., original packets) such that the original source symbols can ideally be recovered from any subset of the encoding symbols of size equal to or only slightly larger than the number of source symbols. Fountain coding may not exhibit a fixed code rate.

A fountain code is optimal if the original k source symbols can be recovered from any k encoding symbols. Some known fountain codes allow the recovery of the original k source symbols from any k' of the encoding symbols with high probability, where k' is just slightly larger than k.

A fountain code encoder is able to generate more coded packets so that the data source (e.g., content server 180, mobile network gateway 170, routers 165, data gateway 160) keeps sending packets until the UE 130 receives enough packets to decode the original message. However, the redundant fountain coded packets may cause congestion in the backhaul network 110 due to imperfect TE controller decisions.

In some embodiments, the coding may be specifically adapted for video transmission, e.g., video conferencing. The video transmission may be based on UDP (user datagram protocol). In yet other embodiments other transmission protocols may be applied.

In some scenarios, packets may have already been forwarded to all serving access points (e.g., serving cell) 123 and 126, and because the UE 130 has moved quickly through the RAN 120, some serving access points 123 and 126 may not be able to deliver the packets to the UE 130. Some radio nodes 123 and 126 may have better links (or channels) than others, and the buffer of these nodes 123 and 126 may be empty if no more packets arrive, resulting in underutilization.

In an example, a file should be transmitted from the data (or traffic) source to the destination (UE). If the file size is 20 Mbit and the packet size is 12 kbit, then there are 1667 packets per file. The TE controller performs a TE operation (TE operation rate) every 0.5 seconds and when new flows arrive. There is no packet forwarding handover and the UE 130 speed is 30 km/h. Simulated results for the above scenario in comparison to other TE methods are presented in FIG. 2.

Figure 2:
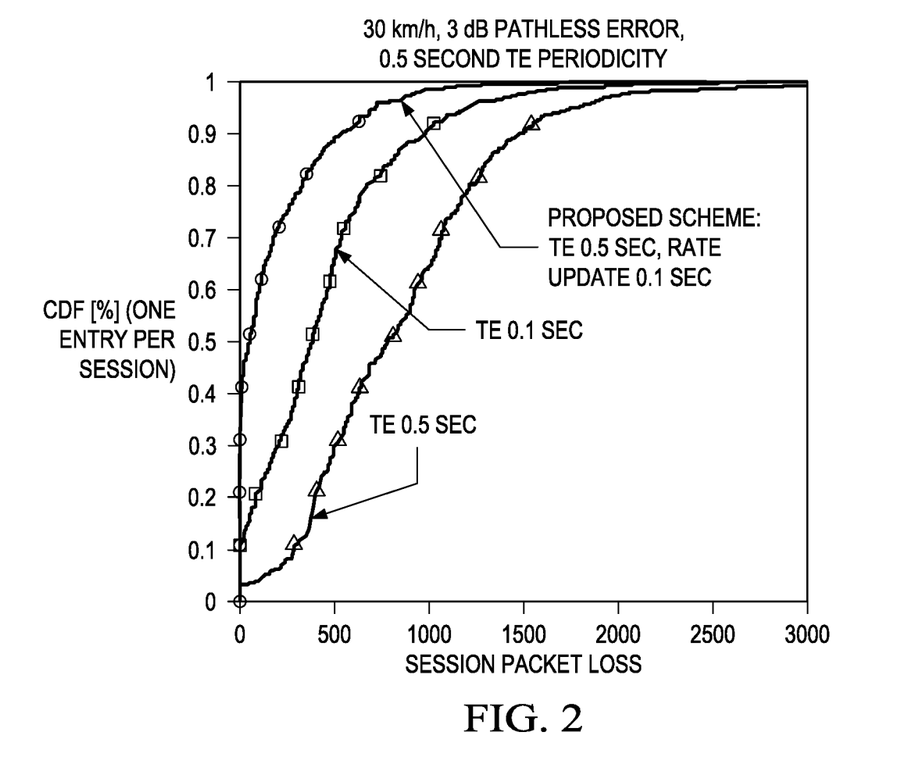
FIG. 2 illustrates simulated results for packet loss when traffic is routed over a single path, two paths and four paths.

In a scenario in which, the TE optimizer sends the data in a single path to the destination about 90% of the data transmission sessions of UEs 130 have less than 500 unused packets. Session packet loss (or unused packets) may mean that the packets have been delivered to and sit in buffers of the radio nodes 123 and 126 and have not been delivered to the UE 130. These packets are redundant. In a scenario where the TE optimizer sends the packets via two paths, about 60% of the data transmission sessions of UEs 130 have less than 500 unused packets and in a scenario with four paths, about 30% of the data transmission sessions of UEs have less than 500 unused packets. Similarly, in a single path scenario about 98% of the data transmission sessions of UEs have less than 1000 unused packets, in a scenario with two paths, about 90% of the data transmission sessions of UEs have less than 1000 unused packets and in a scenario with four paths, about 65% of the data transmission sessions of UEs have less than 500 unused packets.

Packet redundancy can be reduced by having the TE controller recomputed the traffic flow more frequently, e.g., every 0.1 sec. However, this may result in higher complexity and may therefore not be practical due to communication delays.

Figure 3:
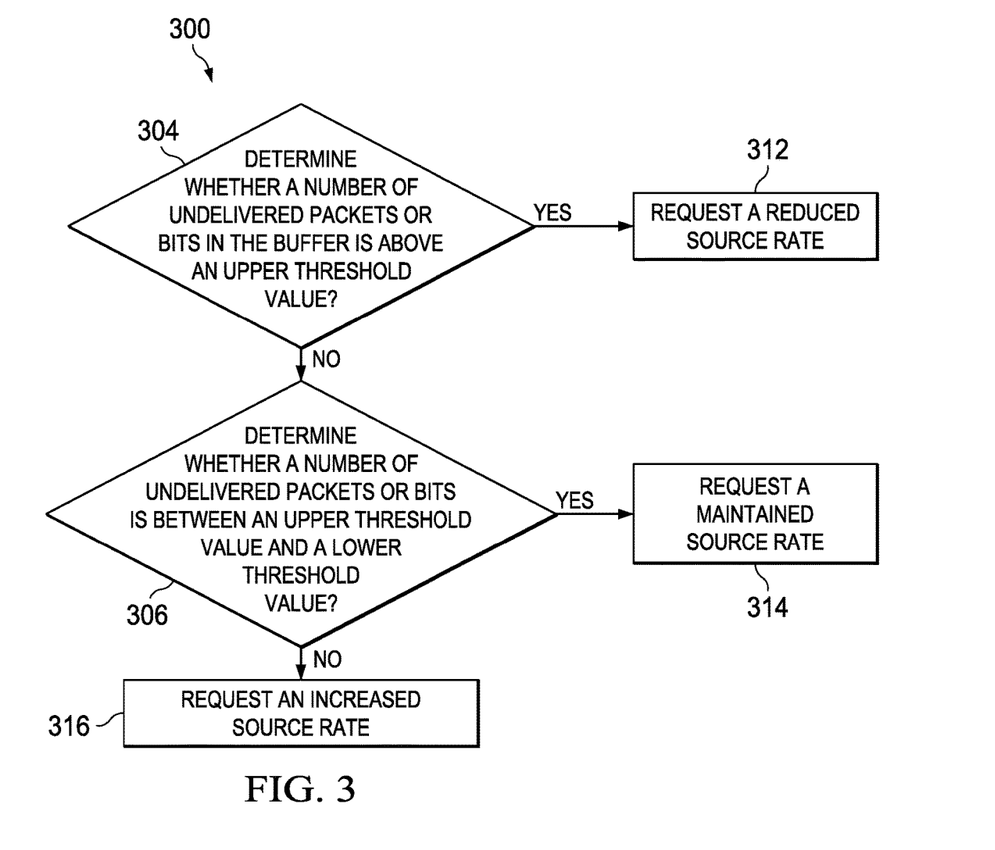
FIG. 3 illustrate a flow chart of a rate adaption method according to an embodiment.

FIG. 3 shows a method 300 for adapting the source rate of a traffic source or a data source according to an embodiment. The method 300 may compensate for imperfect TE rate allocation. The imperfect TE rate allocation may be due to channel state information (CSI) error and mobility of the UEs. The process 300 starts at block 304. At block 304 the radio node determines the status, occupancy or utilization of its buffer. For example, the radio node may determine the number of undelivered packets (e.g., (fountain) encoded packets) or bits in its buffer. If the number of undelivered packets or bits meets or is above an upper threshold value the process moves to processing block 312 for requesting a reduced source rate. In processing block 312, the radio node calculates and requests a new lower source rate. The new lower source rate could be new_rate=old_rate−buffer_size/time_to_clear_buffer. In some embodiments the radio node reports the newly calculated source rate to the traffic source and the traffic source adjusts the source rate (also called traffic rate herein) accordingly. In other embodiments the radio node reports the new source rate to the TE optimizer and the TE optimizer forwards the data rate to the traffic source so that the traffic source adjusts its source rate. In yet other embodiments, the TE optimizer instructs the traffic source to change the source rate so that the traffic source, after reception of the instruction, automatically adjusts its source rate. If the number of delivered packets (or bits) is below the upper threshold value the process advances to decision block 306.

In step 306, the radio node evaluates whether the number of undelivered packets or bits is below the upper threshold value and above a lower threshold value. In some embodiments the lower threshold value is zero. If the number of packets (or bits) is within this range the radio node may calculate a new source rate and request to maintain the current source rate in processing step 314. The radio node may report or notify the traffic source or the TE optimizer to not change the source rate. If the determination of the radio node is not within this range (determination "no"), the process may progress to the processing block 316 for requesting to increase the source rate.

If the buffer is equal or below the lower threshold value (e.g., empty or almost empty), the radio node may evaluate the time the buffer has been empty. Based on the determination that the buffer is below the lower threshold value, the radio node may calculate a new source rate. The radio node may determine that an increased source rate can be supported. This can serve as a basis for requesting an increase in the source rate. For example, the new source rate could be new_rate=k*old_rate, where k is a scalar. In various embodiments, k is dependent on the duration the buffer is empty. In an embodiment, k is a fixed value, such as 1.05. The new source rate allocation is sent to traffic source or the TE optimizer.

The upper threshold value of the buffer can be fixed or variable. In embodiments in which the upper threshold is fixed, the upper threshold value may be 10 packets. In embodiments in which the upper threshold is variable, the upper threshold value may be 0.1*packet_rate, or 10% of the current packet rate. The lower threshold value can also be fixed or variable. In embodiments in which the lower threshold is fixed, it may be set to 1 packet. In embodiments in which the lower it is variable, the lower threshold value can be set to be equal to 0.01*packet_rate, or 1% of the current packet rate. In other embodiments, the lower and upper threshold values can be the same, for example 5 packets, in case it is a fixed threshold values. In yet other embodiments, the lower threshold and upper threshold values can be set to 0.05*packet_rate, or 5% of the current packet rate in case of variable threshold values. In such an embodiment, there is effectively a single threshold for use in the flow chart of FIG. 3. The decision process is then simplified into determining if the buffer status is below the threshold, in which case a request for a higher source rate is transmitted. If the buffer status is below the threshold, a request for a lower source rate can be transmitted. It will be well understood that threshold determination could also be reversed so that the first determination is whether the threshold has been exceeded in which case a lower source rate can be requested.

The updating of the source rate may be performed periodically. Accordingly, the process 300 may be repeated either at fixed intervals or in response to identification of a need.

The process 300 may be performed by a plurality of radio nodes independently. For example, two, three or more radio nodes each may provide a data link to a single UE. The data link may utilize several frequencies from the radio node to the UE. Moreover, the same radio node may provide several data links to the UE for several different mobile communication services. Each service may have its own data source and the radio node may provide a buffer (or a buffer allocation) for each data link.

In some embodiments when the radio node calculates the source rate the radio node may send a source rate update message to the traffic source. For example, the radio node sends the source rate update message to the traffic source providing the traffic source with a flow ID and rate update information (e.g. an indication of the amount of increase or decrease in the rate).

In various embodiments, instead of calculating the update at the radio node, the radio node may forward information as a message to the TE controller and the TE controller calculates the desired source rate (in steps 312, 314 or 316). The TE controller may send a request to the traffic source to adapt the rate accordingly. When the source rate update is calculated by the traffic controller, the feedback message from the radio node to the TE controller may include at least one of a flow ID, a rate update information (amount of rate increase or decrease), a reporting period, a number of unsent packets or bits (buffer status) and a delivered throughput.

In yet other embodiments, instead of calculating the update by the radio node, the radio node may forward information to the traffic source and the traffic source calculates a new source rate and performs the source rate adaption (in step 312, 314 or 316). When the source rate update is calculated by the traffic source the radio node may send a message to the traffic source providing at least one of a flow ID, a rate update information (amount of rate increase or decrease), a reporting period, a number of unsent packets or bits (buffer status) and a delivered throughput.

In some embodiments the source rate is updated more often than the TE operation rate (performed by the TE controller). For example, the source rate may be updated 2 to 10 times (e.g., 5 times) more often than the TE operation rate. In alternative embodiments, the source rate may be updated 3 to 8 times or 4 to 6 times more often than the TE operation rate.

For example if the traffic source is a virtual user gateway and the radio node has a direct communication link to the virtual user gateway, the radio node may directly provide, request or instruct the virtual user gateway with the source rate update/evaluation. Alternatively, if the traffic source is on a content server (within or outside the mobile operator's backhaul) then it is unlikely that the radio node would have a direct interface with this traffic source. In such a scenario, the traffic source may be instructed by the TE optimizer about the rate adaption.

Embodiments of the invention provide that several radio nodes perform the method, determine the statuses of their buffers and report the statuses to the traffic source or instruct the traffic source or TE optimizer about the rate adjustment. The reporting or instructing may be performed asynchronously by the different radio nodes. In various embodiments the radio nodes perform the method independently from each other. In alternative embodiments the radio nodes perform the method together either coordinated or uncoordinated.

In some embodiments, when the traffic source receives requests for different source rates via different paths from the radio nodes or the TE controller, or calculates the different source rates, the source rate from the source to the destination on each path may be differently and independently adjusted. One path may have a higher rate than another path. Moreover, one path may be updated more frequently than the other path. The rate splitter in the routers may follow the new rate assignment (e.g., instructed by the TE controller or some other network control entity). This may be applied for more than two paths and more than two radio nodes.

A benefit of an embodiment is that the rate update mechanism is simple and can avoid the need for centralized optimization. Another benefit to some embodiments is quick reaction to the channel variation even though it still goes through the TE controller. The overall performance can be comparable to or better than the centralized TE, but with better backhaul saving.

Figure 4A:
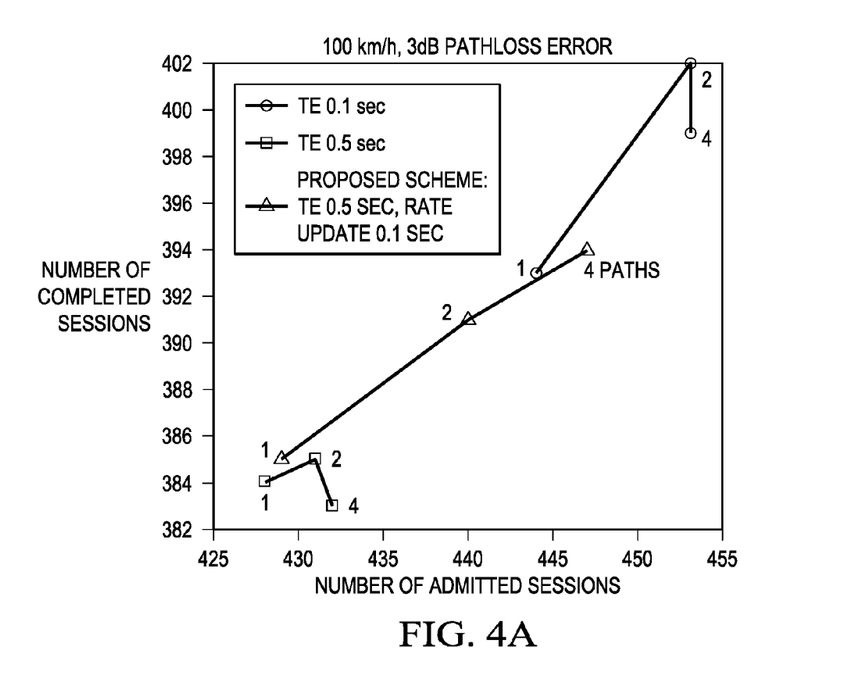
FIGS. 4A and 4B illustrate simulated results of the rate adaption method compared to conventional TE schemes.
Figure 4B:
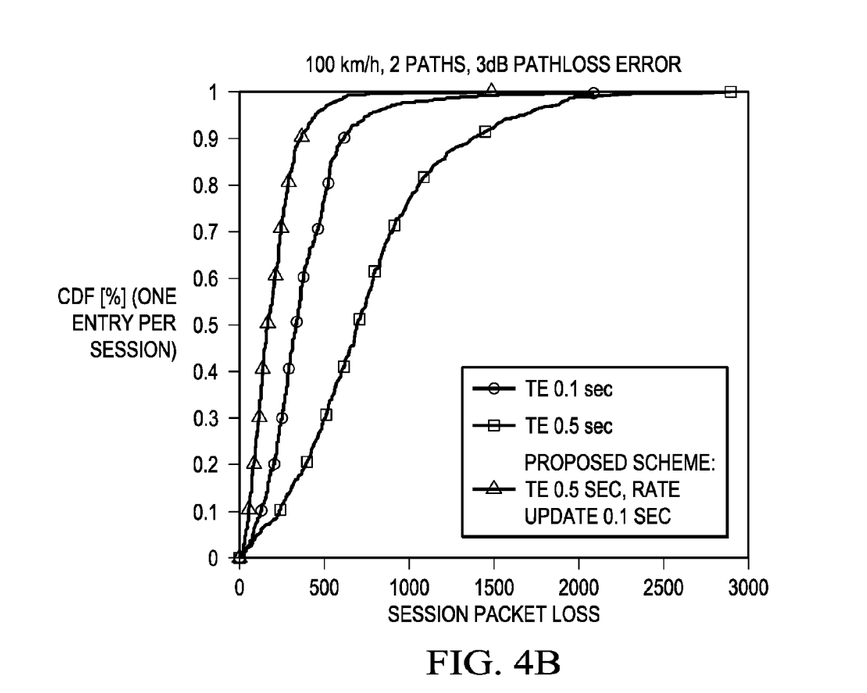

FIGS. 4A and 4B illustrate simulated performance results for a two path TE operation, a 3 dB path loss measurement error of wireless links and a velocity of the UE of 100 km/h. The simulation was performed with, baseband unit transmission (BBU Tx) power of 30 dBm and a file size of 20 Mbit (e.g., 1667 packets). No packets were forwarded when handover was performed.

FIGS. 4A and 4B show the results if the TE controller operates or performs runs every 0.5 seconds or every 0.1 seconds. Moreover, these figures show the results when the TE controller operates every 0.5 seconds with a source rate update every 0.1 seconds (e.g., update five times per TE operation run). FIG. 4A shows the number of completed sessions relative to the number admitted sessions for 1 link, 2 links and 4 links. As can be seen, the embodiment scheme of a TE of 0.5 seconds and source rate update of 0.1 seconds performs better than the TE scheme with a 0.5 seconds interval without per-flow rate update.

FIG. 4B illustrates simulated results for packet losses, i.e., the packets sent to the radio nodes but not delivered to UEs, when traffic is routed over a single path, two paths and four paths. As can be seen, about 30% of the data transmission sessions of UEs have less than 500 unused packets in the buffer for the scenario with 0.5 TE scheme, about 75% of the data transmission sessions of UEs have less than 500 unused packets in the buffer for the scenario with 0.1 TE and about 96% of the data transmission sessions of UEs have less than 500 unused packets for the scenario with 0.5 TE and a rate update of 0.1. Similarly, about 10% of the data transmission sessions of UEs have less than 250 unused packets in the buffer for the scenario with 0.5 TE scheme, about 30% of the data transmission sessions of UEs have less than 250 unused packets in the buffer for the scenario with 0.1 TE and about 75% of the data transmission sessions of UEs have less than 250 unused packets for the scenario with 0.5 TE and a rate update of 0.1.

In other words, the number of redundant packets is reduced by a factor of about 4 and by ⅓ at 90% CDF compared to the TE 0.5 seconds and TE 0.1 seconds periodicity, respectively.

In various embodiments, when the above disclosed rate adaption scheme is compared to the default rate adaption scheme according to the Transmission Control Protocol (TCP), the above disclosed scheme avoids per packet acknowledgement (ACK) by an UE and therefore reduces overhead. The above disclosed rate adaption scheme reports only the number of unsent bits or packets from the radio node. In contrast, the rate adjustment based on TCP is reported from the UE.

In embodiments where the rate update is calculated by a TE controller, information is fed back from the radio nodes to the TE including the reporting period and the number of unsent bits and delivered throughput. In embodiments where the rate update is calculated by the traffic source, the rate and buffer feedback messages goes from the radio nodes to the traffic sources and a new rate calculation method is implemented in the traffic source. The traffic source generates the coded packets. The traffic source can be a media server or gateways 160, 170, for example. In embodiments where the rate update is done at the radio node, the radio nodes need to know the traffic source address and flow identification (ID) to send back the rate update message.

Figure 5:
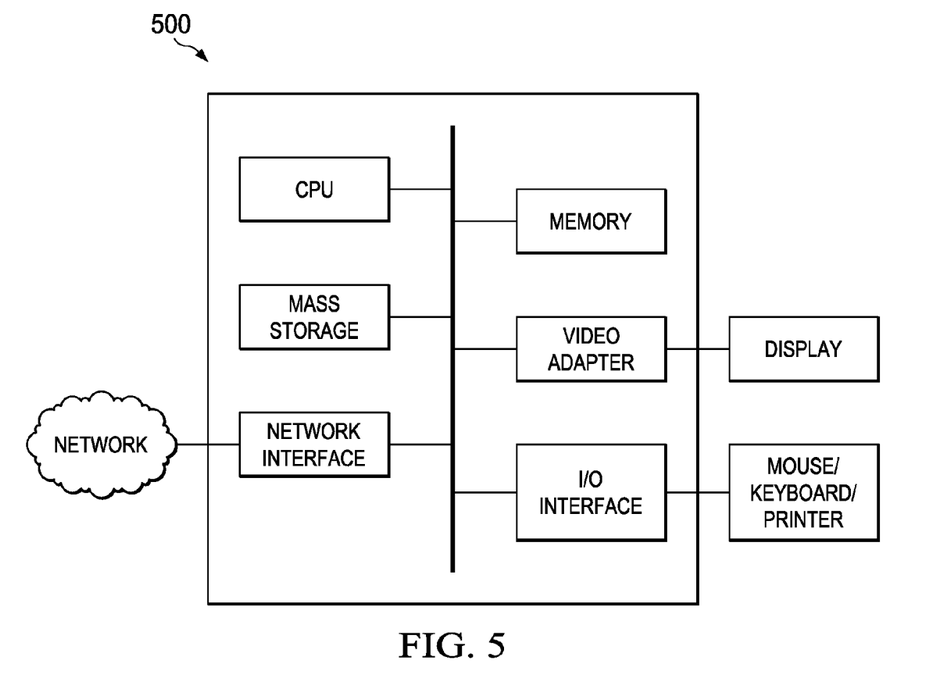
FIG. 5 illustrates a computing platform that may be used for implementing, for example, the devices and methods described herein, in accordance with an embodiment.

FIG. 5 is a block diagram of a processing device 500 that may be used for implementing the apparatuses and methods disclosed herein. Specific devices 500 may utilize all of the components shown, or only a subset of the components, and levels of integration may vary from device to device. Furthermore, a device 500 may contain multiple instances of a component, such as multiple processing units, processors, memories, transmitters, receivers, etc. The processing device 500 may comprise a processing unit equipped with one or more input/output devices, such as a speaker, microphone, mouse, touchscreen, keypad, keyboard, printer, display, and the like. The processing device 500 may include a central processing unit (CPU), memory, a mass storage device, a video adapter, and an I/O interface connected to a bus. In some embodiments, processing device 500 may be a TE controller. In alternative embodiments, the processing device 500 may be radio node (controller).

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

In some embodiments the device 500 may be a radio node.

In various embodiments each radio node 500 has several buffers allocated in the memory, for example. Each buffer is linked to a specific mobile communication service or different types of traffic sources.

The following reference may provide background information to aid in understanding the setting in which the subject matter of the present application may be used, and is incorporated herein by reference:

Hamid Farmanbar and Hang Zhang, U.S. patent application Ser. No. 14/486,853, "System and Method of Traffic Engineering in a Software Defined Radio Access Network," filed Sep. 15, 2014.

Those skilled in the art will appreciate that reference above with respect to the TCP rate adjustments can be more fully understood with reference to:

IETF RFC 793, "TCP protocols," September 1981.

Embodiments of the invention provide a method for rate adaptation, the method comprising determining a source rate adjustment in accordance with a buffer status of a radio node and transmitting towards a traffic source a source rate adjustment request in accordance with the determined source rate adjustment.

Embodiments of the invention comprise that determining the source rate adjustment comprises determining the source rate adjustment by a radio node or by a traffic engineering (TE) controller.

Embodiments of the invention comprise that transmitting towards the traffic source comprises transmitting to a TE controller that instructs the traffic source about the source rate adjustment.

Embodiments of the invention comprise that transmitting towards the traffic source comprises directly transmitting the source rate adjustment to the traffic source.

Embodiments of the inventions comprise that the buffer status comprises buffer utilization, and that the buffer utilization comprises an amount of undelivered data or bits.

Embodiments of the inventions comprise that the source rate adjustment comprises decreasing a source rate when the buffer utilization is above an upper threshold value, maintaining a source rate when the buffer utilization is between an upper threshold value and a lower threshold value, and increasing a source rate when the buffer utilization is below a lower threshold value.

Embodiments of the invention comprise that traffic source is a router or a virtual user gateway.

Embodiments of the invention comprise that determining the source rate adjustment comprises receiving, by a traffic engineering (TE) controller, a first buffer status of a first radio node and calculating, by the TE controller, a first source rate adjustment in accordance with the first buffer status, and wherein transmitting towards the traffic source comprises transmitting towards a traffic source, by the TE controller, a first source rate adjustment request in accordance with the determined first source rate adjustment.

Embodiments of the invention further comprise receiving, by the TE controller, a second buffer status of a second radio node, calculating, by the TE controller, a second source rate adjustment in accordance with the second buffer status and transmitting towards the traffic source, by the TE controller, a second source rate adjustment request in accordance with the determined second source rate adjustment, wherein the first source rate adjustment is for a first link between the traffic source and first radio node, and wherein the second source rate adjustment is for a second link between the traffic source and second radio node.

Embodiments of the invention provide that the first radio node and the second radio node serve the same user equipment (UE).

Embodiments of the invention further comprise operating, by the TE controller, the first link and the second link with a TE operating rate.

Embodiments of the invention comprise that a first source rate and a second source rate are updated more often than the TE operating rate.

Embodiments of the invention further comprise updating a first source rate more often than a second source rate.

Embodiments of the invention comprise a network device providing rate adaptation, wherein the network device includes a processor and a non-transitory computer readable storage medium storing programming for execution by the processor, the programming including instructions for determining a source rate adjustment in accordance with a buffer status of a radio node and transmitting towards a traffic source, a source rate adjustment request in accordance with the determined source rate adjustment.

Embodiments of the invention comprise that the network device is a radio node.

Embodiments of the invention comprise a traffic engineering (TE) controller providing rate adaptation, wherein the TE controller includes a processor and a non-transitory computer readable storage medium storing programming for execution by the processor, the programming including instructions for receiving a buffer status of a radio node, calculating a source rate adjustment in accordance with the buffer status and transmitting towards a traffic source a source rate adjustment request in accordance with the determined source rate adjustment.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for rate adaptation, the method comprising:
  determining a source rate adjustment in accordance with a status of a transmitting buffer of a first radio node, the first radio node receiving data transmitted by a traffic source over a link between the traffic source and the first radio node, buffering the received data in the transmitting buffer, and forwarding the buffered data to a user equipment (UE) over a link between the first radio node and the UE, the status of the transmitting buffer comprising a time period during which a utilization of the transmitting buffer has been below a lower threshold value; and
  transmitting towards the traffic source, a source rate adjustment request to adjust a transmission rate of the data transmitted by the traffic source over the link between the traffic source and the first radio node in accordance with the determined source rate adjustment.

2. The method according to claim 1, wherein determining the source rate adjustment comprises determining the source rate adjustment by the first radio node.

3. The method according to claim 1, wherein determining the source rate adjustment comprises determining the source rate adjustment by a traffic engineering (TE) controller.

4. The method according to claim 1, wherein transmitting towards the traffic source comprises transmitting the source rate adjustment request to a traffic engineering (TE) controller that instructs the traffic source about the source rate adjustment.

5. The method according to claim 1, wherein transmitting towards the traffic source comprises directly transmitting the source rate adjustment to the traffic source.

6. The method according to claim 1, wherein the source rate adjustment comprises increasing a source rate in accordance with the time period when the utilization of the transmitting buffer has been below the lower threshold value.

7. The method according to claim 6, wherein the utilization of the transmitting buffer comprises an amount of undelivered data or bits in the transmitting buffer.

8. The method according to claim 6, wherein the source rate adjustment further comprises decreasing the source rate in response to detecting that the utilization of the transmitting buffer is above an upper threshold value.

9. The method according to claim 6, wherein the source rate adjustment further comprises maintaining the source rate in response to detecting that the utilization of the transmitting buffer is between an upper threshold value and the lower threshold value.

10. The method according to claim 6, wherein the source rate adjustment further comprises increasing the source rate in response to detecting that the utilization of the transmitting buffer is below the lower threshold value.

11. The method according to claim 1, wherein the traffic source is a router.

12. The method according to claim 1, wherein the traffic source is a virtual user gateway.

13. The method according to claim 1, wherein determining the source rate adjustment comprises receiving, by a traffic engineering (TE) controller, the transmitting buffer status of the first radio node and calculating, by the TE controller, the source rate adjustment in accordance with the transmitting buffer status, and wherein transmitting towards the traffic source comprises transmitting towards the traffic source, by the TE controller, the source rate adjustment request in accordance with the determined source rate adjustment.

14. The method according to claim 13, further comprising receiving, by the TE controller, a second transmitting buffer status of a second radio node, the second radio node receiving data transmitted by the traffic source over a second link between the traffic source and the second radio node, buffering the received data in the transmitting buffer of the second radio node, and forwarding the buffered data in the transmitting buffer of the second radio node to the UE over a second link between the second radio node and the UE;
determining, by the TE controller, a second source rate adjustment in accordance with the second transmitting buffer status; and
transmitting towards the traffic source, by the TE controller, a second source rate adjustment request to adjust a transmission rate of the data transmitted by the traffic source over the second link between the traffic source and the second radio node in accordance with the determined second source rate adjustment.

15. The method according to claim 14, wherein the first radio node and the second radio node serve the same UE.

16. The method according to claim 14, further comprising operating, by the TE controller, the link between the traffic source and the first radio node and the second link between the traffic source and the second radio node with a TE operating rate.

17. The method according to claim 16, wherein the source rate adjustment and the second source rate adjustment are updated more often than the TE operating rate.

18. The method according to claim 14, further comprising updating the source rate adjustment more often than the second source rate adjustment.

19. A network device providing rate adaptation comprising:
a processor; and
a non-transitory computer readable storage medium storing programming for execution by the processor, the programming including instructions for:
determining a source rate adjustment in accordance with a status of a transmitting buffer of a radio node, the radio node receiving data transmitted by a traffic source over a link between the traffic source and the radio node, buffering the received data in the transmitting buffer, and forwarding the buffered data to a user equipment (UE) over a link between the radio node and the UE, the status of the transmitting buffer comprising a time period during which a utilization of the transmitting buffer has been below a lower threshold value; and
transmitting towards the traffic source, a source rate adjustment request to adjust a transmission rate of the data transmitted by the traffic source over the link between the traffic source and the radio node in accordance with the determined source rate adjustment.

20. The network device according to claim 19, wherein the network device is the radio node.

21. A traffic engineering (TE) controller providing rate adaptation comprising:
a processor; and
a non-transitory computer readable storage medium storing programming for execution by the processor, the programming including instructions for:
receiving a status of a transmitting buffer of a radio node, the radio node receiving data transmitted by a traffic source over a link between the traffic source and the radio node, buffering the received data in the transmitting buffer, and forwarding the buffered data to a user equipment (UE) over a link between the radio node and the UE, the status of the transmitting buffer comprising a time period during which a utilization of the transmitting buffer has been below a lower threshold value;
determining a source rate adjustment in accordance with the status of the transmitting buffer; and
transmitting towards the traffic source a source rate adjustment request to adjust a transmission rate of the data transmitted by the traffic source over the link between the traffic source and the radio node in accordance with the determined source rate adjustment.

* * * * *